(12) United States Patent
Innes et al.

(10) Patent No.: US 9,886,233 B2
(45) Date of Patent: Feb. 6, 2018

(54) APPARATUS, SYSTEMS AND METHODS FOR AUDIO CONTENT DIAGNOSTICS

(71) Applicant: EchoStar Technologies L.L.C., Englewood, CO (US)

(72) Inventors: David Innes, Littleton, CO (US); Jeremy Mickelsen, Denver, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 115 days.

(21) Appl. No.: 14/921,065

(22) Filed: Oct. 23, 2015

(65) Prior Publication Data

US 2017/0115954 A1    Apr. 27, 2017

(51) Int. Cl.
| | | |
|---|---|---|
| *H04R 29/00* | (2006.01) | |
| *G06F 3/16* | (2006.01) | |
| *G06F 17/27* | (2006.01) | |
| *H04S 7/00* | (2006.01) | |

(52) U.S. Cl.
CPC ............ *G06F 3/165* (2013.01); *G06F 17/275* (2013.01); *G06F 17/2725* (2013.01); *H04R 29/001* (2013.01); *H04S 7/30* (2013.01); *H04R 2420/05* (2013.01)

(58) Field of Classification Search
CPC .. G06F 3/165; G06F 17/2775; G06F 17/2827; H04R 29/001
See application file for complete search history.

(56) References Cited

U.S. PATENT DOCUMENTS

| | | | |
|---|---|---|---|
| 7,149,686 B1* | 12/2006 | Cohen .................... | G10L 15/25 375/E7.271 |
| 2005/0135631 A1* | 6/2005 | Yoshino .................. | H04S 7/301 381/59 |
| 2010/0054454 A1* | 3/2010 | Cao ......................... | H04B 3/23 379/406.08 |
| 2014/0176813 A1* | 6/2014 | Conness ................. | H04N 5/60 348/738 |
| 2016/0014537 A1* | 1/2016 | Lehnert ................ | H04R 29/008 381/58 |
| 2017/0078823 A1* | 3/2017 | Robinson ............... | H04S 7/307 |

* cited by examiner

*Primary Examiner* — Regina N. Holder
(74) *Attorney, Agent, or Firm* — Lowe Graham Jones PLLC

(57) ABSTRACT

Media content systems and methods are operable to detect sound using one or more microphones during presentation of a media content event. The audio content output is changed by a remedial action that is performed if the audio content detected by the microphones does not correspond to the intended audio content of the presented media content event.

14 Claims, 4 Drawing Sheets

APPARATUS, SYSTEMS AND METHODS FOR AUDIO CONTENT DIAGNOSTICS

BACKGROUND

Media devices, such as a set top box, a stereo, a television, a computer system, a game system, or the like, are often configured to output audio content concurrently with presented video content. However, on occasion, the actual presented audio content is not the same as the audio content that is associated with the presented video content. Or, the actual presented audio content is not the "best" available and/or preferred audio content.

Accordingly, there is a need in the arts to provide the correct and/or the best available audio content that corresponds to presented video content.

SUMMARY

Systems and methods of presenting media content are disclosed. An exemplary embodiment has at least one microphone configured to detected sound, wherein the sound includes at least output audio content that is being output from at least one speaker, and has a processor system. The processor system is configured to determine a detected audio characteristic from the detected sound, determine an intended audio characteristic from audio content of a media content event that is currently being presented, compare the determined detected audio characteristic with the determined intended audio characteristic, and perform at least one remedial action in response to the detected audio characteristic not matching the intended audio characteristic, wherein the remedial action changes the output audio content that is being output from the at least one speaker.

BRIEF DESCRIPTION OF THE DRAWINGS

Preferred and alternative embodiments are described in detail below with reference to the following drawings.

DETAILED DESCRIPTION

Figure 1:
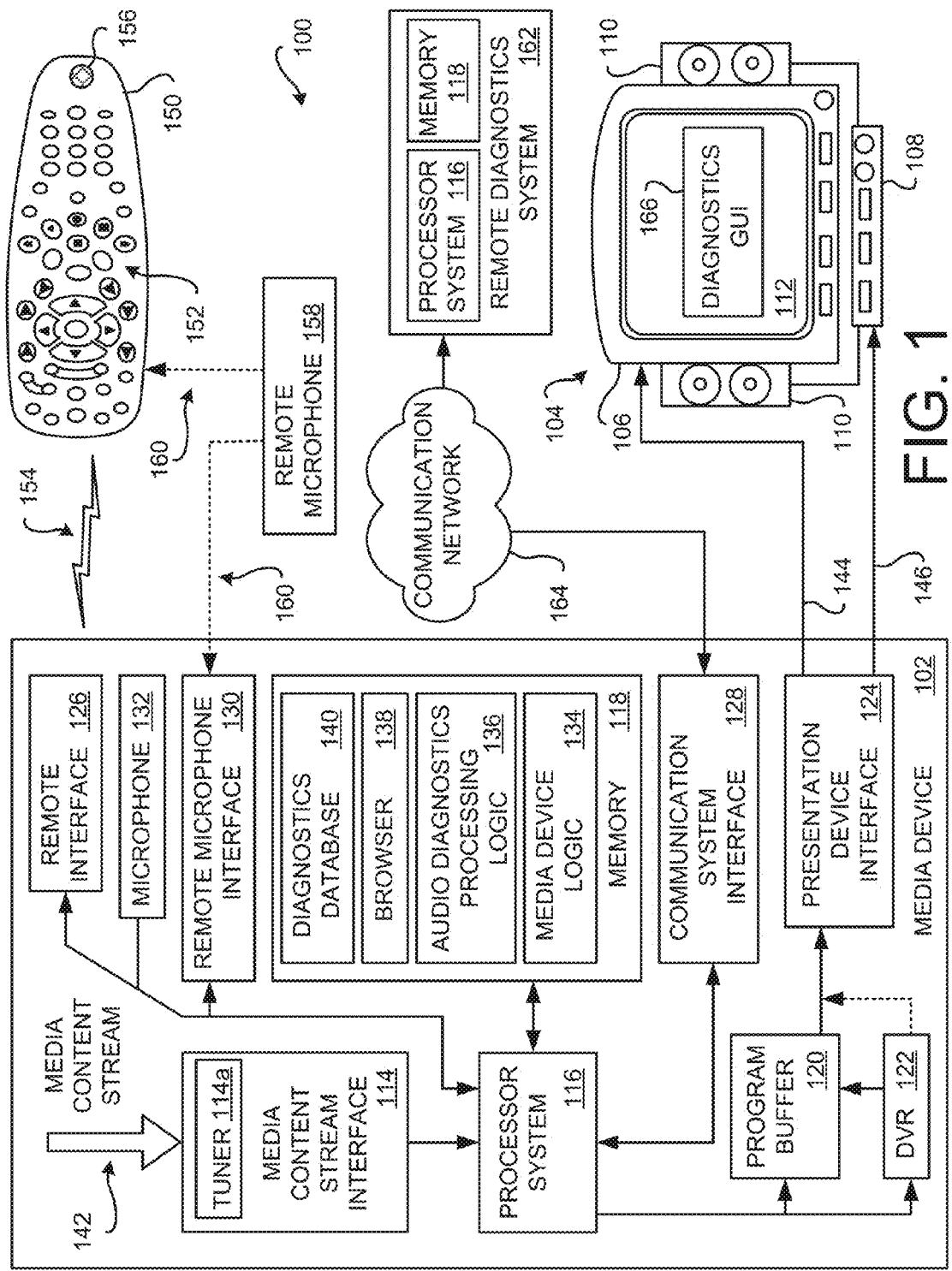
FIG. 1 is a block diagram of an embodiment of an audio diagnostics system implemented in a media device.

FIG. 1 is a block diagram of an embodiment of an audio diagnostics system 100 implemented in a media device 102, such as, but not limited to, a set top box (STB). Embodiments of the audio diagnostics system 100 may be implemented in other media devices, such as, but not limited to, a stereo, a surround-sound receiver, a radio, a television (TV), a digital video disc (DVD) player, a digital video recorder (DVR), a game playing device, or a personal computer (PC).

Embodiments of the audio diagnostics system 100 detect output audio content that is part of a presented media content event. The audio content is concurrently presented with video content. The at least one characteristic (defined as and interchangeably referred to herein as an audio attribute) of the detected output audio content (defined as and interchangeably referred to herein as the detected audio characteristic) determined from the detected sound is compared with a corresponding characteristic the intended audio content (defined as and interchangeably referred to herein as the intended audio content characteristic) that is associated with the presented video content of the intended media content event. That is, the detected audio characteristic is compared with a like characteristic of the intended audio characteristic.

If the output audio content does not correspond to the intended audio content, then embodiments of the audio diagnostics system 100 determine the nature of the difference between the output audio content and the intended audio content (defined as and interchangeably referred to herein as the audio content characteristic deviation). When the determined detected audio characteristic does not correspond to the intended audio content characteristic, then embodiments of the audio diagnostics system 100 implement a remedial action to change the output of the audio content. Preferably, the remedial action corrects, or at least reduces, the determined audio content characteristic deviation. The process of detecting audio sounds, comparing the audio sounds with the intended audio content, and then performing at least one remedial action if the detected sounds do not correspond to the intended audio content is defined as and is interchangeably referred to herein as an audio diagnostics process.

For example, a user of the media device 102 may be viewing a media content event, such as a movie (the intended media content event) that has audio content that is available in either stereo or surround sound audio content (the intended audio content) and stereo audio content. Here, the audio attribute is the type of audio content, here surround sound or stereo. For example, but not limited to, the surround sound may be available in 5.1 channel surround sound or another surround sound format. In a hypothetical example, the initially detected output audio content may in stereo. Here, the detected audio characteristic is that the audio content is being output using two stereo channels of audio. However, if the intended audio content characteristic is that the audio is to be output in surround sound (predefined based on a specified user preference). The audio diagnostics system 100 may then determine that the predefined user preference is for presentation of audio content in surround sound when surround sound audio content is available. Then, the audio diagnostics system 100 implements a remedial action that changes the output audio content from the stereo audio content to the user preferred surround sound audio content of the movie. In an example embodiment, the audio diagnostics system 100 changes an audio channel input of the media device 102 or a component of a media presentation system 104 from a stereo audio input channel to a surround sound audio input channel.

As another example, a first media content event may be a movie that is received at the media device 102 from a first source. Another second media content event may also be currently received at the media device 102 from a second source. The audio diagnostics system 100 may detect and determine that the actual output audio content initially corresponds to the audio content of the second media content event. Here, the detected audio characteristic corresponds to the second media content event. However, the intended audio content characteristic is the first media content event. The determined audio content characteristic deviation is that the audio content of the media content events are not the same. Then the audio diagnostics system 100 changes audio output to the first media content event, here the movie (the first media content event). That is, the remedial action implemented by the audio diagnostics system 100 is to change the audio input to receive the first source so that the actual output audio content is then the audio content of the movie.

The exemplary media device 102 is communicatively coupled to the media presentation system 104 that includes a visual display device 106, such as a television (hereafter, generically a TV 106), and an audio presentation device 108, such as a surround sound receiver controlling an audio reproduction device (hereafter, generically, a speaker 110). Other types of output devices may also be coupled to the media device 102, including those providing any sort of stimuli sensible by a human being, such as temperature, vibration and the like. The video portion of the media content event is displayed on the display 112 and the audio portion of the media content event is reproduced as sounds by one or more speakers 110. In some embodiments, the media device 102 and one or more of the components of the media presentation system 104 may be integrated into a single electronic device.

The non-limiting exemplary media device 102 comprises a media content stream interface 114, a processor system 116, a memory 118, a program buffer 120, an optional digital video recorder (DVR) 122, a presentation device interface 124, a remote interface 126, a optional communication system interface 128, an optional remote microphone interface 130, and an optional microphone 132. The memory 118 comprises portions for storing the media device logic 134, the audio diagnostics processing logic 136, an optional browser 138 and an optional diagnostics database 140. In some embodiments, the media device logic 134, the audio diagnostics processing logic 136, and/or the browser 138 may be integrated together, and/or may be integrated with other logic. In other embodiments, some or all of these memory and other data manipulation functions may be provided using a remote server or other electronic devices suitably connected via the Internet or otherwise to a client device. Other media devices may include some, or may omit some, of the above-described media processing components. Further, additional components not described herein may be included in alternative embodiments.

The functionality of the media device 102, here a set top box, is now broadly described. In a satellite broadcast system, a media content provider provides media content that is received in one or more multiple media content streams 142 multiplexed together in one or more transport channels. The transport channels with the media content streams 142 are communicated to the media device 102 from a media system sourced from a remote head end facility (not shown) operated by the media content provider. The media device 102 is configured to receive one or more broadcasted satellite signals detected by an antenna (not shown). Non-limiting examples of other media systems that broadcast a media content stream 142 include a cable system, a radio frequency (RF) communication system, and the Internet.

The one or more media content streams 142 are received by the media content stream interface 114. In a broadcast environment, one or more tuners 114a in the media content stream interface 114 selectively tune to one of the media content streams 142 in accordance with instructions received from the processor system 116. The processor system 116, executing the media device logic 134 and based upon a request for a media content event of interest specified by a user, parses out media content associated with the media content event of interest. The media content event of interest is then assembled into a stream of video and/or audio information which may be stored by the program buffer 120 such that the video and the audio content of a media content event selected for presentation can be streamed out to components of the media presentation system 104, such as the visual display device 106 and/or the audio presentation device 108, via the presentation device interface 124 which is communicatively coupled to the visual display device 106 via the connector 144 and/or to the audio presentation device 108 via the connector 146. Alternatively, or additionally, the parsed out media content may be saved into the DVR 122 for later presentation. The DVR 122 may be directly provided in, locally connected to, or remotely connected to, the media device 102. In alternative embodiments, the media content streams 142 may stored for later decompression, processing and/or decryption.

The exemplary media device 102 is configured to receive commands from a user via a remote control 150. The remote control 150 includes one or more controllers 152 disposed on the surface of the remote control 150. The user, by actuating one or more of the controllers 152, causes the remote control 150 to generate and transmit commands, via a wireless signal 154, to the media device 102. The commands control the media device 102 and/or control the components of the media presentation system 104. The wireless signal 154 may be an infrared (IR) signal or a radio frequency (RF) signal that is detectable by the remote interface 126.

The processes performed by the media device 102 relating to the processing of the received media content stream 142 and communication of a presentable media content event to the components of the media presentation system 104 are generally implemented by the processor system 116 while executing the media device logic 134. Thus, the media device 102 may perform a variety of functions related to the processing and presentation of one or more media content events received in the media content stream 142.

Depending upon the particular embodiment, the remote control 150 may include a remote control microphone 156 disposed on the surface of the remote control 150. The remote control microphone 156 detects ambient noise, which includes the actual output audio content from the speakers 110 of the audio presentation device 108, from speakers (not shown) of the visual display device 106, or another audio output device (not shown).

It is appreciated that the location of the remote control 150 may vary depending upon where the user is using the remote control 150. In some situations, the remote control may be configured to control multiple media devices 102 which may themselves be located in different locations, such as in different rooms in the user's house. Thus, the remote control microphone 156 may not necessarily be detecting the output audio content of the intended media content event that is being presented from components of the media presentation system 104 that are receiving the intended media content event from the media device 102.

Accordingly, some embodiments may be configured to cause the remote control 150 to determine which particular media device 102 it is in proximity to when a diagnostic procedure is performed by the audio diagnostics system 100. Here, the remote control 150 would be in two-way communication with the media device(s) 102, wherein the media device 102 currently in communication with the remote control 150 indicates its identity to the remote control 150, via the wireless signal 154. Alternatively, or additionally, the remote control 150 may indicate its identity to the media device 102. Then, a determination may be made whether the detected sounds are being output from one or more components of the media presentation system 104 that is communicatively coupled to that particular responding media device 102. If the detected sounds are the same as the audio content being output from one or more components of the media presentation system 104, the audio diagnostics process may proceed. Otherwise, the diagnostics process is not performed.

In some embodiments, a remote microphone 158 is used to detect the output audio content from components of the media presentation system 104. Here, the remote microphone 158 is placed in a known location in the vicinity of the components of the media presentation system 104 so as to be located and/or oriented to detect the output audio content. In such embodiments, the remote microphone 158 can be located at any suitable location in proximity to the components of the media presentation system 104 that are outputting audio content to ensure that the output audio content is being presented. Further, the remote microphone 158 may be located and/or oriented so that detection of any potential interfering noise from other noise sources that would otherwise be detected by the remote microphone 158 is reduced or mitigated.

The remote microphone 158 may be communicatively coupled to the media device 102 and/or the remote control 150, via communication link 160. The communication link 160 may be implemented using a physical connector and/or a wireless signal, such as an IR signal or a RF signal. In some alternative embodiments, the wireless signal communicated from the remote microphone 158 in the communication link 160 may be detectable by the remote interface 126.

In some embodiments, a microphone 132 may be included in the media device 102 to detect the output audio content. Presumably, the microphone 132 will be in proximity to the components of the media presentation system 104 that are outputting audio content. Here, the microphone 132 is presumed to be in the vicinity of the components of the media presentation system 104 since the media device 102 is providing the media content event(s) to the media presentation system 104.

In the various embodiments, the audio diagnostics processing logic 134 is configured to analyze sounds from one of the detecting microphones 132/156/158, discriminate the output audio content from the detected sounds, analyze one or more characteristics of the output audio content, and then perform at least one remedial action that changes the characteristic of the output audio content. For example, if the actual output audio content (the determined detected audio characteristic) is determined to not match the corresponding intended audio content characteristic of the video portion of a presented media content event, then a different audio input is provided to the media presentation system 104.

The new output audio content is then detected by the microphones 132/156/158. The new detected audio characteristic is then determined. If the new detected audio characteristic still does not match the intended audio content characteristic of the video portion of a presented media content event, then another different audio input is provided to the media presentation system 104. The process repeats until the detected audio characteristic does match the intended audio content characteristic of the video portion of a presented media content event.

In some embodiments, the media device 102 may be configured to provide the detected output audio content (with the detected audio characteristic therein) to a remote diagnostics system 162. The remote diagnostics system 162 may include the processor system 116 and the memory 118 (configured for operation at the remote diagnostics system 162). The remote diagnostics system 162 may be communicatively coupled to the media device via a communication network 164, at the communication system interface 128.

The communication network 164 is illustrated as a generic communication system. In one embodiment, the communication network 164 comprises a cellular telephone system, such as a radio frequency (RF) wireless system. Accordingly, the media device 102 includes a suitable transceiver. Alternatively, the communication network 164 may be a telephony system, the Internet, a Wi-fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the media device 102 may be implemented to communicate using other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments of the media device 102 may be configured to communicate over combination systems having a plurality of segments which employ different formats for each segment that employ different technologies on each segment.

The microphones 132/156/158 may provide the detected sounds to the remote diagnostics system 162. Alternatively, or additionally, the media device 102 may determine and then provide one or more detected audio characteristics to the remote diagnostics system 162. For example, the user may call into a help center or the like. The technician troubleshooting the media device 102 may cause the media device 102 to communicatively couple to the remote diagnostics system 162. Based on the detected sounds at the media device 102, embodiments of the audio diagnostics system 100 at the remote diagnostics system 162 may cause the media device 102 to perform one or more remedial actions. Alternatively, or additionally, the technician and/or the user may perform one or more remedial actions based on the information that is then available to the technician.

In some embodiments, a diagnostics graphical user interface (GUI) 166 may be presented to the user during a diagnostics operation. For example, the user of the media device 102 may be provided the opportunity to specify which particular remedial action is preferred. For example, the user may specify a sound channel preference (such as stereo or 5.1 surround sound), a preferred native language, a level of bass and/or treble output, or some other determinable characteristic of the output audio content.

In some situations, the user may wish to deactivate operation of the audio diagnostics system 100. Here, the diagnostics GUI 166 may permit the user to shut off or otherwise deactivate the audio diagnostics system 100 so that, for example, the user may view the video portion of a sporting event while listening to a music station or a local broadcast of the sporting event from a radio station or the like.

In the various embodiments, various selectable remedial actions may be predefined and stored in the diagnostics database 140. For example, a selection order of a series of remedial actions, such as the order of input channel changes, may be predefined and saved. In some embodiments, user preferences for particular remedial actions, and/or the circumstances in which user preferred remedial action will be selected, may be stored in the diagnostics database. For example, the user may prefer that audio content be presented in a surround format when a movie is being presented, and may prefer that audio content be presented using a stereo format if audio content is being received in an over the air broadcast signal.

Figure 2:
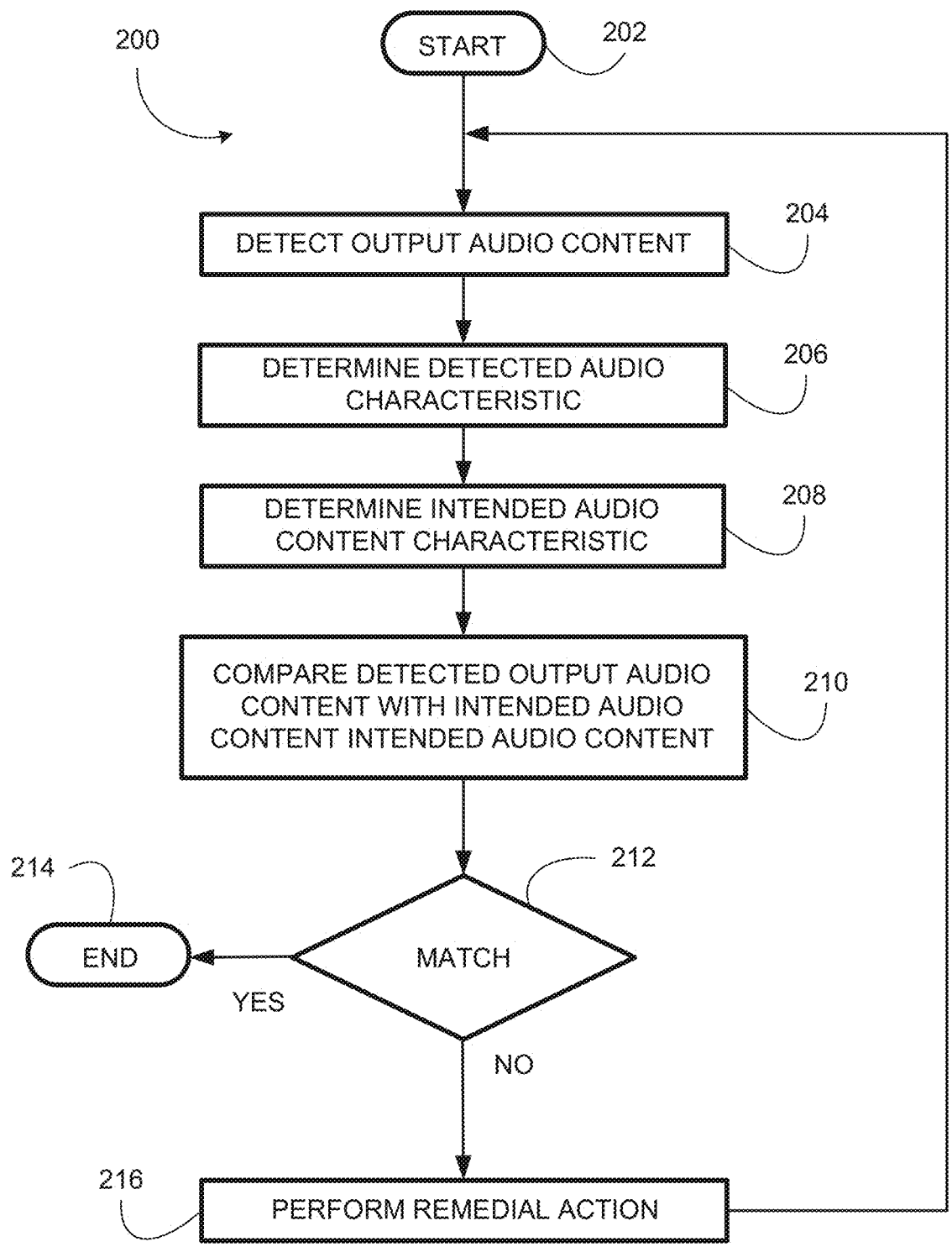
FIG. 2 is a flowchart illustrating an audio diagnostics process performed by the audio diagnostics system.

FIG. 2 is a flowchart 200 illustrating an non-limiting example of an audio diagnostics process performed by the audio diagnostics system 100. The flowchart 200 shows the architecture, functionality, and operation of a possible implementation of the software for implementing the audio diagnostics processing logic 136 (FIG. 1). In this regard, each block may represent a module, segment, or portion of code, which comprises one or more executable instructions for implementing the specified logical function(s). It should also be noted that in some alternative implementations, the functions noted in the blocks may occur out of the order noted in FIG. 2, may include additional functions, and/or may omit some functions. For example, two blocks shown in succession in FIG. 2 may in fact be executed substantially concurrently, the blocks may sometimes be executed in the reverse order, or some of the blocks may not be executed in all instances, depending upon the functionality involved. All such modifications and variations are intended to be included herein within the scope of this disclosure.

The process starts at block 202. At block 204, the currently output audio content is detected by one or more of the microphones 132/156/158. Here, the detected sound includes at least output audio content that is being output from at least one speaker, such as the speaker 110 or the speakers of the TV 106. At block 206, the detected audio characteristic is determined from the output audio content detected at block 204.

At block 208, the corresponding intended audio content characteristic from the intended media content event is determined by the audio diagnostics system 100. Here, the media device 102 is outputting known video content, through the presentation device interface 124, to components of the media presentation system 104. Accordingly, the processor system 116 may access the audio portion of that particular processing media content stream having the output video content to obtain the intended audio content. The intended audio content may be accessed as the media content stream 142 is being received at the media content stream interface 114, as the media content stream 142 is being stored, processed or output from the program buffer 120, and/or as the audio content is being output over the connector 144. The audio diagnostics system 100 may then determine the intended audio content characteristic from the accessed intended audio content.

At block 210, a comparison is made between the detected audio characteristic and the intended audio content characteristic. If, at block 212, the detected audio characteristic and the intended audio content characteristic are the same (match), or are substantially the same, the process proceeds to block 214 and ends.

If the detected audio characteristic and the intended audio content characteristic are not the same (match), or are substantially not the same, or are otherwise different by some measurable threshold value, the process proceeds to block 216. At block 216, a remedial action is performed.

Any suitable variety of remedial actions and/or number of remedial actions may be implements at block 214 depending upon the embodiment of the audio diagnostics system 100 and depending upon the nature of the diagnosed audio characteristic. For example, but not limited to, if the detected output audio content does not match the video portion of a presented media content event at block 210, the output audio input channel to the audio presentation device 108 may be changed to a different channel (preferably to match the currently presented movie).

After the remedial action process has been implemented, the diagnostics process returns to block 204, wherein the new output audio content (that has been adjusted by the implemented remedial action) is detected. The newly detected output audio content is processed to determine the detected audio characteristic. The intended audio content is then again accessed (optionally), and the current intended audio content characteristic is determined. The new detected audio characteristic and the current intended audio content characteristic are compared. The process continues to repetitively cycle through blocks 204, 206, 208, 210, 212 and 216 until the detected output audio content and the accessed intended audio content are the same, or are substantially the same, wherein the process is able to proceed to block 214 to end.

Figure 3:
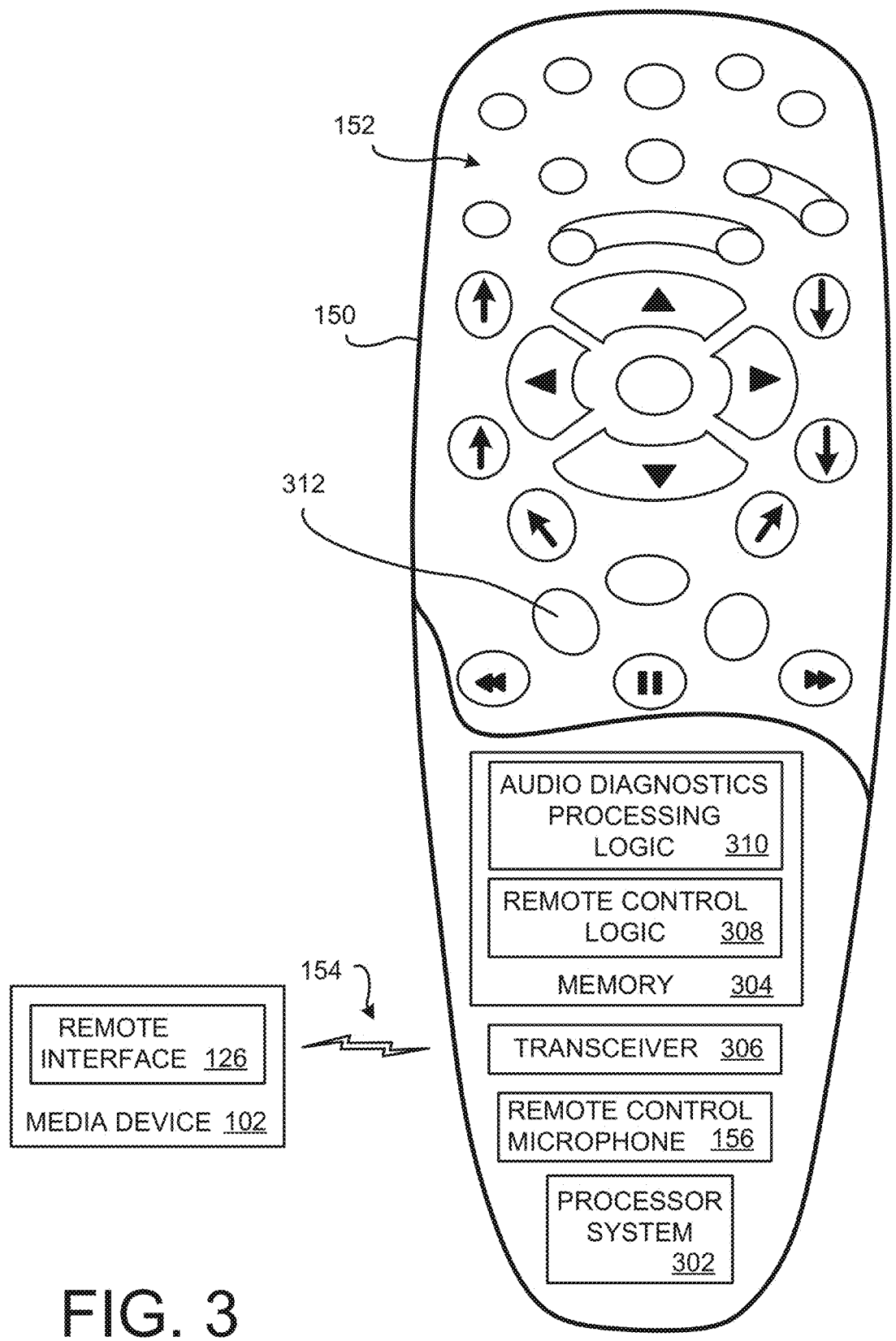
FIG. 3 is a block diagram of an embodiment of an audio diagnostics system implemented in a remote control.

FIG. 3 is a block diagram of an embodiment of an audio diagnostics system 100 implemented in a remote control 150. The non-limiting exemplary remote control 150 comprises a processor system 302, a memory 304, a transceiver 306, and the remote control microphone 156. The memory 304 comprises portions for storing the remote control logic 308 and the audio diagnostics processing logic 310. Other remote control devices may include some, or may omit some, of the above-described components. Further, additional components not described herein may be included in alternative embodiments. For example, the remote control 150 may be a smart phone, notepad or other electronic device configured to control the media device 102 and/or components of the media presentation system 104 (FIG. 1).

The remote control microphone 156 detects output audio content. The detected audio output is then used to determine the detected audio characteristic.

The transceiver 306 is a two-way communication device configured to transmit and receive RF format signals in the wireless signal 154 that is communicated from/to the media device 102. In this example embodiment, the media device remote interface 126 is also a transceiver. Accordingly, the media device 102 may communicate information corresponding to the intended audio content to the remote control 150.

In an example embodiment, the media device 102 accesses and then communicates the intended audio content itself to the remote control 150. The remote control 150 then determines the intended audio content characteristic. In another embodiment, the media device 102 determines the intended audio content characteristic, and then communicates information corresponding to the intended audio content characteristic to the remote control 150. In yet another non-limiting example embodiment, the remote control 150 may determine the detected audio characteristic based on the sounds detected by its remote control microphone 156, and then communicate the determined detected audio characteristic to the media device 102.

In some embodiments, as the remote control 150 is performing an audio diagnostics process in accordance with the audio diagnostics processing logic 310, the various remedial actions that are implemented when the detected audio characteristic and the intended audio content characteristic are not the same (match), or are not substantially the same, the remote control 150 may itself generate and then issue commands in the wireless signal 154 that are received by the media device 102 and/or components of the media presentation system 104. Here, the remote control 150 is operative to directly control the media device and/or components of the media presentation system 104 such that the remedial actions are then implemented based on the issued remote control commands.

In some embodiments, a dedicated or predefined one of the controllers 152, such as but not limited to the example controller 312 (FIG. 3), may be used to initiate the audio diagnostics process performed by the audio diagnostics system 100. For example, the user may not be satisfied with the current output audio content (such as if there is an echo, delay, and/or other noticeable distortion). The user may actuate the controller 312, predefined to with the associated command to initiate the audio diagnostics process, such that the audio diagnostics system 100 detects the current output audio content, and then implements a corrective remedial action so that the new output audio content is satisfactory to the user.

The process of initiating an audio diagnostics process may be initiated in a variety of other manners. Some embodiments may automatically initiate the audio diagnostics process each time the user changes channels (changes to a different media content event), such as when one or more of the controllers 152 of the remote control 150 are actuated. Alternatively, or additionally, the audio diagnostics system 100 may automatically initiate the audio diagnostics process when the media device 102 and/or components of the media presentation system 104 are initially activated by the user (turned "on"). Alternatively, or additionally, the audio diagnostics system 100 may automatically initiate the audio diagnostics process if a service interruption occurs. Alternatively, or additionally, the audio diagnostics system 100 may initiate the audio diagnostics process in response to an instruction from a technician at the remote diagnostics system 162 during a trouble shooting event. Alternatively, or additionally, the audio diagnostics system 100 may initiate the audio diagnostics process when a controller disposed on the surface of, or elsewhere in, the media device 102 (not shown) is actuated, such as when an installer is initially installing the media device 102 at the user's residence or the like. Alternatively, or additionally, the audio diagnostics system 100 may initiate the audio diagnostics process by a user selection made via a presented diagnostics GUI 166.

Alternatively, or additionally, the audio diagnostics system 100 may automatically initiate the audio diagnostics process if a significant change (greater than a threshold value) in the detected sounds by one or more of the microphones 132/156/158 occurs. For example, a loud ambient noise may abruptly occur so as to interfere with the output audio content. If a non-limiting example remedial action is to adjust output volume, the audio diagnostics process may be initiated.

It is appreciated that some media content events may be presented in standard definition TV with only a single audio track or two audio tracks (stereo, with left and right channels). Other media content events, such as high definition (HD) content, may be presented with multiple audio tracks, such as, but not limited to, an example 5.1 surround sound audio track (with five or more audio channels) and a separate stereo audio track (with two audio channels). Further, the user may have preferences regarding which particular audio track they wish to listen to if multiple audio tracks are available, such as when stereo and 5.1 surround audio tracks are selectively available. Thus, embodiments of the audio diagnostics system 100 may automatically initiate an audio diagnostics process each time the user changes media content events to ensure that the detected actual audio output content corresponds to the intended audio content that has been predefined as a user preference.

In the various embodiments, sounds detected by one or more of the microphones 132/156/158 are processed to determine the detected audio characteristic. Any suitable detected audio characteristic may be used for comparing with the intended audio content characteristic during an audio diagnostics process. Further, multiple detected audio characteristics may be determined, and then compared with corresponding intended audio content characteristics, to more reliably and accurately determine the associated audio content characteristic deviations, and thereby identify one or more remedial actions that should be implemented.

An example audio characteristic may be dialogue being spoken by actors performing in the media content event that is currently being presented to the user. The sounds detected by the microphones 132/156/158 should include the dialogue, if present, that is output from the media device 102 and/or components of the media presentation system 104. Embodiments of the audio diagnostics system 100 may include a speech recognition algorithm and a speech to text conversion algorithm. Any suitable speech recognition algorithm and/or speech to text conversion algorithm now known or later developed may be used by the various embodiments.

The speech recognition algorithm, in a first operation, analyzes the sounds detected by the microphones 132/156/158 and discerns (determines) the dialogue (spoken words) in the detected sound. The speech to text conversion algorithm, in a first operation, determines text corresponding to the discerned (determined) dialogue.

For example, the user may be selecting a particular media content event, such as a movie, for viewing. During the audio diagnostics process, the movie's audio content portion (interchangeably referred to herein as an audio track) corresponding to the currently presenting video portion of the movie is accessed by the audio diagnostics system 100. This accessed audio content of the currently presenting media content event is the intended audio content. The speech recognition algorithm, in a second operation, discerns the dialogue occurring in the intended audio content. The speech to text conversion algorithm, in a second operation, is then used to determine text from the discerned dialogue of the accessed audio portion of the currently presented portion of the movie.

To illustrate an example audio diagnostics process, consider a simplified hypothetical example of a movie that is currently presenting a scene with a single actor speaking to another off-camera actor. The video portion of the currently presented movie will presumably show the single actor and/or some relevant scene background, with the presented audio content (which includes the dialogue being spoken by the actor and any background sound effects and/or background music) being synchronously presented with the video portion of the move. That is, the movement of the single actor's lips will correspond to the separately presented dialogue (of the presented audio portion of the movie) as the image of the single actor is being presented on the display 112 (FIG. 1). Here, suppose that the single actor is currently saying "Let's go, it is time to leave" to the off-camera actor. The audio diagnostics system 100 accesses the audio portion of the movie, and the speech recognition algorithm discerns the single actor's speech from any background sound effects and/or background music. Then, the speech to text conversion algorithm generates the text "Let's go, it is time to leave" from the discerned dialogue.

Concurrently, the microphones 132/156/158 are detecting sounds, presumably which include presentation of the same audio portion of the movie. Here, the audio diagnostics system 100 receives the detected sounds. The speech recognition algorithm discerns the actor's speech from any background sound effects, background music, and/or other ambient noise or sounds. Non-limiting examples of other ambient noise or sounds includes conversations between multiple users, noise emitted by other devices (such as a ringing phone or a noisy air conditioner unit), or noise from sources outside of the media room (such as passing vehicles, song birds, playing children, barking dogs, etc.), or the like. Any suitable system or process now known or later developed may be used to discriminate dialogue of the media content event (the movie) from other detected sounds. Then, the speech to text conversion algorithm generates the text "Let's go, it is time to leave" from the discerned dialogue.

Next, the audio diagnostics system 100 compares the text "Let's go, it is time to leave" (determined from the discerned dialogue of the intended audio content) with the text "Let's go, it is time to leave" (determined from the discerned dialogue of the sounds detected by the microphones 132/156/158). Since the determined text (words and/or letters) of the discerned dialogue of the intended audio content matches with the text determined from the discerned dialogue of the sounds detected by the microphones 132/156/158, the audio diagnostics system 100 determines that the currently output audio content from the media device 102 and/or components of the media presentation system 104 is from the currently presenting movie. That is, there is no audio content characteristic deviation in this simplified example. Thus, the audio diagnostics process ends (see block 214 of FIG. 2) because of the above-described determination that the correct audio track is being presented to the user.

On the other hand, the text determined from the discerned dialogue of the intended audio content may not match with the determined text from the discerned dialogue of the sounds detected by the microphones 132/156/158. Here, the audio content characteristic deviation is that the words determined from the detected sound does not match the words determined from the movie's audio track. In this situation, the audio diagnostics system 100 determines that the currently presented output audio content from the media device 102 and/or components of the media presentation system 104 is from the currently presenting movie do not match (as determined at block 212 of FIG. 2). Then, a remedial action would be initiated by the audio diagnostics system 100 (see block 216 of FIG. 2).

Figure 4:
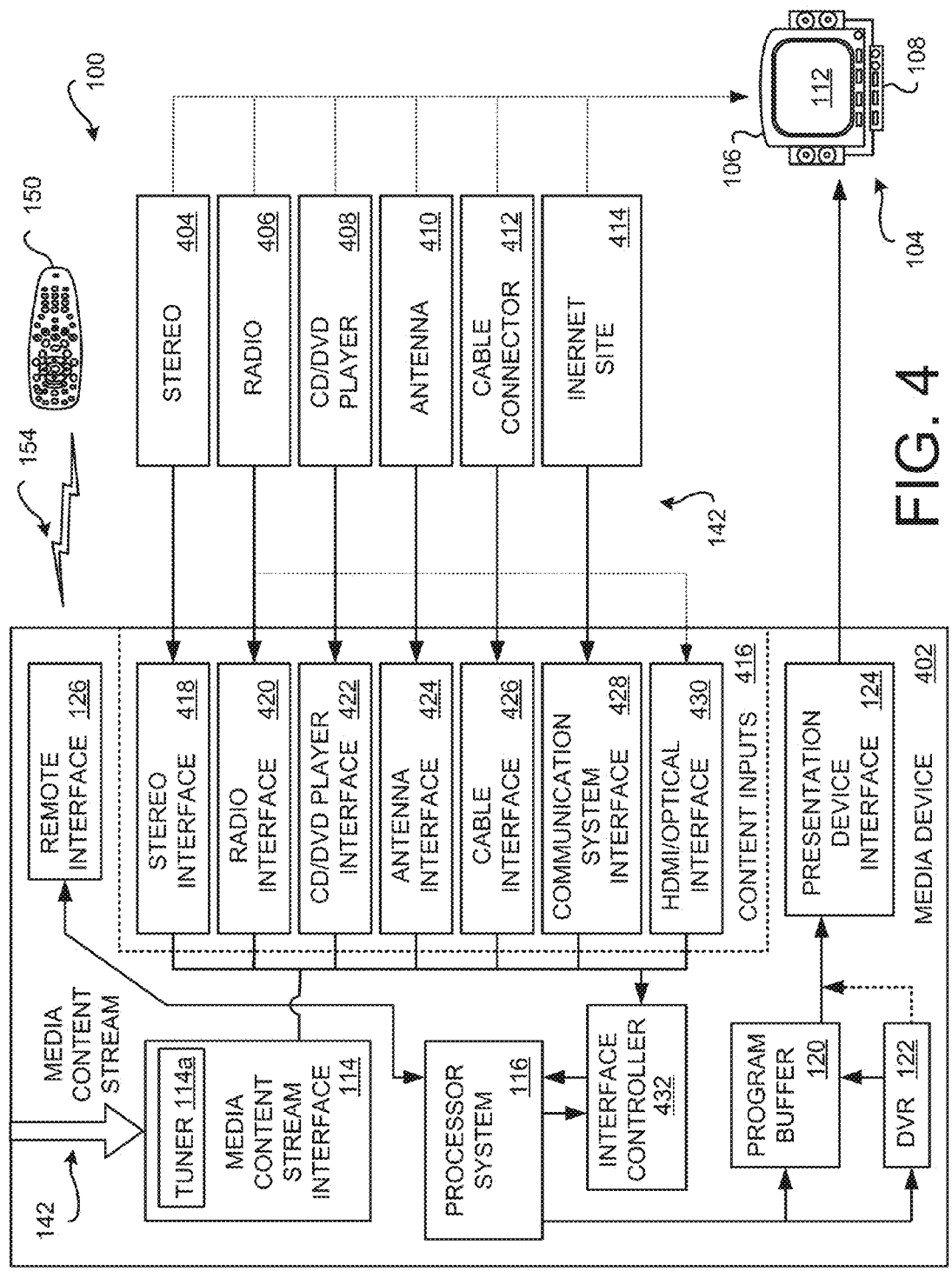
FIG. 4 illustrates a non-limiting example media device, which may be a set top box, a television, and/or another electronic device.

FIG. 4 illustrates a non-limiting example media device 402, which may be a set top box, a television, and/or another electronic device. The audio diagnostics system 100 may be located in the set top box, the television, the remote control 150 and/or the other electronic device. For example, the exemplary media device 402 may optionally have a remote interface 126, a program buffer 120, the DVR 122, or any other suitable component. Further, the media device 402 may include the memory 118 and optionally include therein the above-described login and/or information.

It is appreciated that the media device 402 is configured to receive audio input from a plurality of various different sources of media content, such as a stereo 404, a radio 406, a CD/DVD player 408, an antenna 410 (detecting an over the air broadcast), a cable connector 412 (coaxial cable or fiber optic cable), a media content stream source providing the media content stream 142, and/or the Internet site 414.

The various content sources are connectable to the media device 402 and/or components of the media presentation system 104 via various available input interfaces, generically and collectively shown at the content inputs 416. The non-limiting exemplary content inputs 416 comprises a stereo interface 418, a radio interface 420, a CD/DVD player interface 422, an antenna interface 424, a cable interface 426, the media content stream interface 114. Each of these sources of media content may provide a media content stream 142 to the media device 402. Other input interfaces now known or later developed may be provided to the media device 402.

Typically, these various interfaces include a video input and an audio input. If wire connectors are used to connect the source device to the respective input interface, a separate video connector and a separate audio connector may be used. A single connector, such as a HMDI or optical connector coupled to the corresponding HDMI/Optical interface 430, may be used depending upon the source of media content. For example, the CD/DVD player 408 may be configured to output media content stream 142 from separate wire connectors and/or a HDMI or optical type connector. Some connections to the inputs may be wireless.

Further, the various sources of media content may be configured to directly connect to one or more of the components of the media presentation system 104. For example, the CD/DVD player 408 may be configured to output the video content portion of the media content stream 142 to the media device 402, which presents a high quality video content signal to the display 112. Concurrently, the audio content portion may be communicated from the CD/DVD player 408 to the surround sound receiver from separate wire connectors, and/or a HDMI, optical type or wireless connector. When such systems comprising the media device 402 and the components of the media presentation system 104 are communicatively coupled to difference sources of media content in such manners, it is appreciated that the there is a likelihood that the presented audio content and the presented video content may become mismatched.

These various video content inputs and audio content inputs, interchangeably referred to herein as video input channels and audio input channels, respectively. These input channels are controllable by the interface controller 432. The interface controller 432, based on instructions received from the processor system 116, controls which particular selected channels of video content and audio content are processed, and then provided to the components of the media presentation system 104. That is, the processor communicates an instruction signal to the interface controller 432. The interface controller 432 then operates to selectively receive media content for the designated media content source, which is then processed and is communicated to components of the media presentation system 104.

The particular source of media content is selectable by the user, and/or may be automatically selectable by the media device 102, such as when HDMI connectors are being used, Further, components of the media presentation system 104 may be selected by the audio diagnostics system 100 when a remedial action is being implemented during an audio diagnostics process. In this simplified illustrative example above, wherein the discerned dialogue of the intended audio content (the movie) does not match with the determined text from the discerned dialogue of the detected sounds, the remedial action implemented by the audio diagnostics system 100 is to automatically change the current audio input channel to a different audio input channel at one of the media device 102/402 and/or components of the media presentation system 104 (see block 216 of FIG. 2). For example, the processor system 116 may operate the interface controller 432 to provide the intended audio output.

Then, after the first remedial action has been completed (changing to another audio input channel), the audio diagnostics system 100 receives new sounds being detected by the microphones 132/156/158. The newly detected sounds are processed such that new text is determined from any discerned dialogue. However, it is appreciated that the newly determined text from the detected sounds must be compared with the current intended audio content because, by that time, the dialogue of the currently presenting portion of the user's intended media content event will be different. Therefore, the current intended audio content is concurrently accessed and text is determined therefrom. If the newly determined text from the detected sounds corresponds to the newly determined text of the intended audio content, then the audio diagnostics system 100 determines that the currently output audio content from the media device 102/402, and/or components of the media presentation system 104, is from the currently presenting movie. That is, the remedial action was successful (wherein there was no audio content characteristic deviation because the discerned dialogue of the movie now matches with the determined text from the discerned dialogue of the detected sounds). Thus, the audio diagnostics process ends.

However, if the newly determined text from the detected sounds still does not correspond to (does not match) the newly determined text of the intended audio content, then the audio diagnostics system 100 determines that further remedial actions are needed. Here, another audio content input may be selected (a second remedial action), sounds then detected, text determined therefrom, and then compared (in accordance with the looping process of blocks 204, 206, 208, 210 and 212 of FIG. 2). The iterative process continues until the detected sounds indicate that the correct audio input channel is being used by the media device 102/402, and/or components of the media presentation system 104. Then, the audio diagnostics process ends.

In some embodiments, the closed captioning text of the intended media content event may be available. In an example embodiment, the corresponding closed caption text for the time period that the text was determined from the sounds detected by the microphones 132/156/158 are be compared. Based on a match between the determined text and the closed captioning text, or a match in text that is within some predefined threshold, a determination is made whether the audio content output by the media device 102/402 and/or components of the media presentation system 104 corresponds to the intended audio content.

It is appreciated that other detectable sounds may distort or otherwise impact the determination of the audio content characteristic that is determined based on the sounds detected by the microphones 132/156/158. For example, when multiple users are present, their conversation is likely to be detected with detection of the current audio output from the media device 102 and/or components of the media presentation system 104. Returning to the simplified hypothetical example above, consider that the user spoke "John, please pass me my cocktail" at the same time that the output from the media device 102 and/or components of the media presentation system 104 included the dialogue "Let's go, it is time to leave." Here, the determined text (the audio content characteristic) would be "Let's go, it is time to leave . . . John, please pass me my cocktail." (More likely, the determined words of the two phrases above will be interleaved together.) Accordingly, the text determined from the sounds detected by the microphones 132/156/158 would not match the text determined from the intended media content event, here "Let's go, it is time to leave." However, a sufficient number of individual text words match such that the audio diagnostics system 100 may determine that the correct audio input channel is being used by the media device 102/402 and/or components of the media presentation system 104. Thus, some embodiments may determine a number of words that are different (or the number of matching text words) between the determined text of the detected sounds and the text determined from the intended audio content, and then compare the determined difference in the text words (or the number of matching text words) with a predefined threshold. If the number of words in the text determined from the detected sounds is within the threshold, then the audio diagnostics system 100 determines that the currently output audio content from the media device 102/402 and/or components of the media presentation system 104 is from the currently presenting movie (and the audio diagnostics process ends). Alternatively, or additionally, a ratio between the number of words in the text determined from the detected sounds and the number of words in the text determined from the intended audio content may be compared with a threshold ratio.

Further, the above-described threshold number or ratio of text words may be related to a predefined duration. One skilled in the art appreciates that some duration of time is required for dialogue (of multiple spoken words) to be presented in a scene. An example embodiment may employ a predefined duration window of five seconds that is used during the audio diagnostics process. Here, the number of words in the text determined from the detected sounds and the number of words in the text determined from the intended audio content, or the ratio determined therefrom, is based on the three second predefined duration. That is, only five seconds of detected sounds are compared with three seconds of the intended audio content. Any suitable duration may be used by the various embodiments.

Further, some embodiments may optionally employ a sliding window duration for evaluation. Further, the evaluated sliding window duration may be evaluated over a longer duration for an iteration of the audio diagnostics process. For example, the three second predefined duration may be evaluated along a sliding timeline of five seconds. Accordingly, if a sufficient match in text over any particular three second window duration during the five seconds of the audio diagnostics process will be sufficient for the determination of whether the text matches.

Alternatively, or additionally, some embodiments may employ an active and/or passive filtering system to filter out some sounds that are included in the sound detected by the microphones 132/156/158. For example, a sound associated with a large volume change might be filtered out. Known sounds likely to be detected by the microphones 132/156/158 (such a telephone ring tone, a passing vehicle, a barking dog or the like) may be filtered out from the detected sounds. Such active and/or passive filtering systems in the audio diagnostics processing logic 136 (FIG. 1) may be implemented using hardware, logic, firmware, or a combination thereof.

Alternatively, or additionally, other audio content characteristics may be employed by the audio diagnostics system 100. Some embodiments may determine the presentation time difference between sound information, such as the above-described text determined from the sounds detected by the microphones 132/156/158 and sound information determined from the intended media content event.

Returning to the above-described hypothetical example above, the text "Let's go, it is time to leave" (determined from the discerned dialogue of the sounds detected by the microphones 132/156/158) may be presented some duration behind the intended presentation time of the corresponding text of the audio content of the currently presented media content event. For example, a single word may be selected, and the presentation time determined for that selected word.

Alternatively, or additionally, a discernible sound may be selected, and the presentation time determined for that selected sound. Any suitable discernible sound may be selected and the presentation time determined. For example, a musical note or melody may be used. As another non-limiting example, an explosion, lightning, gunshot, horn honk, dog bark or the like may be used as a discernible sound. Any discernible sound that can be identified from the intended audio content and the detected sounds may be used in the various embodiments.

Although the audio diagnostics system 100 may determine that the correct audio content is being output by the media device 102/402 and/or components of the media presentation system 104, a presentation time delay may be determined (the audio content characteristic deviation). That is, the presentation of the audio content is not correctly synchronized with presentation of the video content, known as the lip sync problem. Such a determined presentation delay in the audio content may be determined to be an unacceptable audio content characteristic deviation (outside of some predefined presentation time threshold). Accordingly, a corrective remedial action is warranted. Here, an embodiment of the audio diagnostics system 100 would automatically change the presentation time of the audio content (the remedial action) by some predefined amount based on the detected presentation time difference (the audio content characteristic). Then, the audio diagnostics system 100 could next determine if there was a continuing audio content characteristic deviation that would require further presentation time adjustment.

Another audio content characteristic is a determination of sound output from multiple speakers. For example, the currently presenting video portion may show a first actor and a second actor having a conversation (dialogue). In accordance with the intended audio content, the first actor's voice may be output from a left channel speaker, and the second actor's voice may be output from a right channel speaker. Some embodiments may concurrently receive detected sounds from a plurality of microphones 132/156/158. Accordingly, the detected sounds may be analyzed to determine the direction of emitted sound, and or whether the sound is even being emitted from different directions (that is, from different speakers, such as the rear channel speakers in 5.1 surround sound audio content). In some embodiments, the remedial action may be to change the audio channel balancing (increasing output from one or more of the audio channels of individual speaker or speaker groups).

As another non-limiting example, if the audio track of the movie contains multiple channels (such as stereo, surround sound 5.1, or the like), the multiple audio input channels may each be analyzed to identify corresponding text from the dialogue being presented from each audio input channel. Optionally, the generated text may be combined (in a synchronous manner, thus emulating a conversation between a plurality of actors speaking in the movie, for example) to determine the intended audio content characteristic (here, the text of the movie dialogue corresponding to the video portion of the movie that is being currently presented to the user). Here, the detected sounds may be compared with the various different audio input channels of the intended audio content to determine if the media device 102/402 and/or components of the media presentation system 104 are presenting the correct audio content.

In addition to detection of text, or alternatively, some embodiments of the audio diagnostics system 100 may analyze other sounds. For example, but not limited to, embodiments may detect the presence of (or absence of) music. If the intended audio content characteristic includes both dialogue (words) and music, and if no music is detected, then the audio diagnostics system 100 may determine that the audio content being presented by the media device 102/402 and/or components of the media presentation system 104 does not correspond to the audio content of the intended media content event.

Conversely, if the intended audio content characteristic includes dialogue (words) with no music, and if music is detected, then the audio diagnostics system 100 may determine that the audio content being presented does not correspond to the audio content of the intended media content event. However, one skilled in the art appreciates that detected music may be coming from other noise sources. Accordingly, in this exemplary situation, one or more other audio content characteristics may be considered so as to improve the accuracy and/or reliability of any determinations made by the audio diagnostics system 100.

In some embodiments, sound quality may be an audio content characteristic that is used to determine and/or implement a remedial action. For example, if the bass tones and/or treble tones of the detected sounds are not as intended, the bass and or treble controllers may be automatically adjusted.

In some embodiments, an absence of sounds may be an audio content characteristic. For example, the media device 102/402 and/or components of the media presentation system 104 may have been inadvertently set to a mute or silence mode of operation. The remedial action would be to activate the sound output (end the mute or silence mode of operation). Alternatively, or additionally, a remedial action may be to increase volume output by some predefined increment.

In some embodiments, presentation of the media content event may be paused otherwise stopped. One or more test tones may then be generated and output by the media device 102/402 and/or components of the media presentation system 104. Here, the intended audio content is the generated test tone. The microphones 132/156/158 detect the test tone sound. Then, the audio diagnostics system 100 compares the detected test tone sounds with the generated test tones. Any differences between the detected test tones and the generated test tones may be used to define an audio content characteristic deviation, and then used to determine a corrective remedial action.

In some embodiments, a language of the detected sound may be an audio content characteristic. For example, the media device 102/402 and/or components of the media presentation system 104 may be outputting the audio content in a first language. However, the user may have specified (predefined) a preference for the audio to be output in a second different language. Generated text from the sounds detected by the microphones 132/156/158 are used to compare with known text of various languages, or at least the preferred language. If the detected language of the audio output is not the preferred language (here, the audio content characteristic deviation is a mismatch in languages), then the remedial action would be to change to an audio channel having the audio content of the intended foreign language.

Some embodiments of the audio diagnostics system 100 may analyze an audio signature (also known as an acoustic fingerprint) of the detected sounds with a corresponding audio signature of the intended audio content. If the compared audio signatures are entirely different, then the audio diagnostics system 100 may determine that the audio content being presented by the media device 102/402 and/or components of the media presentation system 104 does not correspond to the audio content of the intended media content event. Remedial actions may be to automatically cycle through different audio input channels until the correct audio input channel (that is outputting the intended audio content) is selected by the media device 102/402 and/or components of the media presentation system 104.

An audio signature (acoustic fingerprint) is a condensed digital summary, deterministically generated from an audio signal. The determined audio signature can be used to identify that characteristics of an audio sample. A first audio signature can be determined from the sounds detected by the microphones 132/156/158. A second audio signature can be determined from a selected corresponding portion of the intended audio content. The audio signatures are then compared with each other. If the compared audio signatures match, are the same, or are substantially the same within some predefined threshold, the audio diagnostics system 100 may determine that the audio content being presented by the media device 102/402 and/or components of the media presentation system 104 corresponds to the audio content of the intended media content event (that is, there is no audio content characteristic deviation). On the other hand, if the audio signatures are different, or are different beyond a predefined threshold, then the audio diagnostics system 100 may determine that the audio content being presented by the media device 102/402 and/or components of the media presentation system 104 does not correspond to the audio content of the intended media content event. A remedial action may then be implemented.

Any suitable audio signal (acoustic fingerprint) algorithm now known or later developed may be used by the various embodiments. Preferably, the audio signatures may be generated for a short but meaningful predefined duration that is sufficient for a reliable and accurate comparison. For example, the duration may be predefined to be several seconds. Further, a sliding window of time over a longer duration may be used by some embodiments as described above.

In some embodiments, the compared audio signatures may indicate a presentation timing difference between the actual presentation of the audio content detected by the microphones 132/156/158 and the intended presentation time indicated by the intended audio content (wherein the determined time delay is the audio content characteristic deviation). Here, the remedial action may be to incrementally delay or advance presentation of the audio content output by the media device 102/402 and/or components of the media presentation system 104 until the presented audio content is presented in synchronism with the presented video content.

In some situations, the detected audio signature may indicate that multiple audio input channels are concurrently being output by the media device 102/402 and/or components of the media presentation system 104. For example, if the TV used to display the video content is also presenting the audio content, and if concurrently the speakers 110 of the audio presentation device 108 (the surround sound receiver) are presenting audio content, the duplicate concurrent presentation of audio content may be determined to be the audio content characteristic deviation. Here, the remedial action may be to turn off the TV speakers so that the audio content is being presented only by the speakers 110. Alternatively, the remedial action may be to turn off the speakers 110 so that the audio content is being presented only by the TV speakers.

An audio signature based on detected sounds may vary from the audio signature generated from the intended audio content because of other noise or sounds introduced by other sources. Accordingly, an audio signature threshold may be used to compare the audio signature based on detected sounds and the audio signature generated from the intended audio content. If the audio signatures are within the predefined audio signature threshold, then the audio diagnostics system 100 may determine that the audio content being presented by the media device 102/402 and/or components of the media presentation system 104 corresponds to the audio content of the intended media content event. Any suitable audio signature threshold, and process of comparing audio signatures with the audio signature threshold, now known or later developed may be used by the various embodiments of the audio diagnostics system 100.

Another exemplary audio signature is an audio watermark that may be added into the audio portion of media content stream. Audio watermarks may be added by the media content producer or other interested third party to identify the media content event. The watermark may include information pertinent to various aspects of digital rights management (DRM). Accordingly, a detected audio watermark may provide information that may be used by the above-described embodiments of the audio diagnostics system 100, and then be used to define one or more remedial actions.

Some audio compression formats may introduce artifacts into the presented audio content. For example, compression may cause a pre-echo, a well known "swirlies" and/or an absence of signal in frequencies below a predefined spectral mask. Such compression-related artifacts may be detected by the above-described embodiments of the audio diagnostics system 100, and then be used to define one or more remedial actions.

Remedial actions may be effected in a variety of manners. In some embodiments, the media device 102/402 may automatically implement the remedial actions to reconfigure itself to output the correct audio content to the components of the media presentation system 104. For example, the media device may automatically change output audio for a first foreign language to a second foreign language. As another non-limiting example, the media device 102/402 may automatically change its audio input channels so that the correct audio content is being provided to the components of the media presentation system 104.

Alternatively, or additionally, some media systems may be configured to respond to consumer electronics council (CEC) formatted commands between electronic devices that are communicatively coupled together using high-definition multimedia interface (HDMI) connectors. For example, but not limited to, the media device 102/402 may automatically communicate a CEC type remedial action instruction, via a HDMI connector, to one or more of the components of the media presentation system 104 during an audio diagnostics process.

Alternatively, or additionally, remedial action instructions may be generated by the remote control 150 and communicated to the media device 102/402 and/or components of the media presentation system 104, via the wireless signal 154. In some embodiments, an IR blaster may be communicatively coupled to the media device 102/402. The media device 102/402 may then communicate the remedial action commands to the components of the media presentation system 104 via the IR blaster.

In some embodiments, one or more remedial actions may be predefined as a preferred remedial action. In an example embodiment, the user may be able to specify one or more remedial actions as preferred remedial actions via the diagnostics GUI 166. For example, the user may specify a preference for 5.1 channel surround sound over stereo. Thus, remedial actions intended to change audio presentation to the preferred 5.1 channel surround sound are initially selected as remedial actions. If the 5.1 channel surround sound options do not result in the presentation of the correct audio content (such as when the media content event is available only in stereo), then subsequent non-5.1 channel surround sound are tried after the possible 5.1 channel surround sound options are exhausted.

As another example, some audio presentation devices 108 (the surround sound receivers) provide different output audio special effect modes, such as theatre, movie, etc. Thus, a remedial action implemented by embodiments of the audio diagnostics system 100 may be to cycle through these different available audio special effect modes. The user may have predefined a preference for a movie sound special effect mode if a media content event from a DVD is being presented. If the detected sounds indicate that the output audio content is not using the movie sound special effect mode, and if the media content event is being provided by the DVD player, then the remedial action is to change to the movie sound special effect mode. Alternatively, the user may have predefined another special effect mode for presentation of audio content when the media content event is being received from another source, such as a broadcast media content stream 142. Here, the other preferred special effect mode would be the selected for a remedial action.

For example, the user may be watching a movie, wherein the audio content and the video content of the movie is being communicated to the TV 106. However, the user may prefer that the audio output be muted at the TV 106 such that the TV speakers do not output the movie audio content, only the video content of the movie on its display 112. The user may prefer that the speakers 110 controlled by the audio presentation device 108 (the surround sound receiver) be used to output the movie audio content. Here, the intended audio content may be accessed at the media content stream interface 114, at the program buffer 120, and/or from the connector 144. A mute control signal may be sent to the TV 106. Alternatively, the audio content may be blocked (not transmitted) out from the presentation device interface 124 via the connector 144. Here, the audio content would be communicated (transmitted) out from the presentation device interface 124 via the connector 146.

It should be emphasized that the above-described embodiments of the audio diagnostics system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method that presents media content, the method comprising:
   detecting sound using at least one microphone, wherein the detected sound includes at least audio content that is being output from at least one speaker;
   determining a detected audio characteristic from the detected sound;
   determining an intended audio characteristic from audio content of a media content event that is currently being presented;
      wherein the intended audio characteristic is the same as the detected audio characteristic, and
      wherein the intended audio content characteristic is determined during a duration that the sound detection occurs;
   comparing the determined detected audio characteristic with the determined intended audio characteristic; and
   performing at least one remedial action in response to the detected audio characteristic not matching the intended audio characteristic, wherein the remedial action changes the audio content that is being output from the at least one speaker;
   wherein determining the detected audio characteristic from the detected sound comprises:
      discerning first dialogue from the detected sound; and
      determining first text from the discerned first dialogue,
   wherein determining the intended audio characteristic from the audio content of the media content event comprises:
      discerning second dialogue from the audio content of the media content event; and
      determining second text from the discerned second dialogue,
   wherein comparing the determined detected audio characteristic with the determined intended audio characteristic comprises comparing the first text with the second text, and
   wherein the at least one remedial action is performed in response to the first text not matching the second text.

2. The method of claim 1, wherein performing the at least one remedial action comprises:
   changing an audio channel input from a first audio input channel to a second audio input channel.

3. The method of claim 1, wherein comparing the first text with the second text comprises:
   determining a first number of words of the first text;
   determining a second number of words of the second text;
   determining a difference between the first number of words and the second number of words;
   comparing the difference with a threshold number; and
   performing the at least one remedial action when the difference is less than or equal to the threshold number.

4. The method of claim 1, wherein comparing the first text with the second text comprises:
   determining a first number of words of the first text;
   determining a second number of words of the second text;
   determining a ratio between the first number of words and the second number of words;
   comparing the ratio with a threshold ratio; and
   performing the at least one remedial action when the difference is less than or equal to the threshold ratio.

5. A method that presents media content, the method comrpising:
   detecing sound using at least one microphone, wherein the detected sound includes at least audio content that is being output from at least one speaker;
   determining a detected audio characteristic from the detected sound;
   determining an intended audio characteristic from audio content of a media content event that is currently being presented;
      wherein the inteded audio characteristic is the same as the detected audio characteristic, and wherein the intended audio content characteristic is determined during a duration that the sound detection occurs;
comparing the determined detected audio characteristic with the determined intended audio characteristic; and
performing at least one remedial action in response to the detected audio characteristic not matching the inteded audio characteristic, wherein the remedial action changes the audio content that is being output from the at least one speaker;
wherein determining the detected audio characteristic from the detected sound comprises determining whether the output from the at least one speaker is output in stereo or is output in surround sound,
wherein determining the intended audio characteristic from the audio content of the media content event comprises determining whether the audio content of the media content event that is currently output is available in stereo and is available in surround sound,
wherein comparing the determined detected audio characteristic with the determined intended audio characteristic comprises:
determining that the output from the at least one speaker is output in stereo; and
determining a predefined user preference for presentation of audio content in surround sound when surround sound audio content is available,
wherein performing the at least one remedial action comprises changing an audio channel input from a stereo audio input channel to a surround sound audio input channel when the predefined user preference is for the surround sound audio content.

6. A method that presents media content, the method comprising:
detecting sound using at least one microphone, wherein the detected sound includes at least audio content that is being output from at least one speaker;
determining a detected audio characteristics from the detected sound;
determining an intended audio characteristic from audio content of a media content event that is currently being presented,
wherein the intended audio charateristic is the same as the detected audio characteristic, and
wherein the intended audio content characteristic is determined during a duration that the sound detection occurs:
comparing the determined detected audio characteristic with the determined intended audio characteristic; and
performing at least one remedial action in response to the detected audio characteristic not matching the intended audio characteristic, wherein the remedial action changes the audio content that is being output from the at least one speaker,
wherein determining the detected audio characteristic from the detected sound comprises:
discerning first dialogue from the detected sound; and
determining a first language of the first dialogue,
wherein determining the intended audio characteristic from the audio content of the media content event comprises:
discerning second dialogue from the audio content of the media content event; and
determining a second language from the discerned second dialogue,
wherein comparing the determined detected audio characteristic with the determined intended audio characteristic comprises:
determining whether the audio content of the media content event that is currently output is available in the first language and is available in the second language; and
determining a predefined user language preference for presentation of audio content,
wherein performing the at least one remedial action comprises changing an audio channel input from a first audio input channel having the first language to a second audio input channel having the second language when the predefined user language preference is for the second language.

7. A method that presents media content, the method comprising:
detecting sound using at least one microphone, wherein the detected sound includes at least audio content that is being output from at least one speaker;
determining a detected audio characteristic from the detected sound;
determining an intended audio characteristic from audio content of a media content event that is currently being presented,
wherein the intended audio characteristic is the same as the detected audio characteristic; and
wherein the intended audio content characteristic is determined during a duration that the sound detection occurs:
comparing the determined detected audio characteristic with the determined intended audio characteristic; and
performing at least one remedial action in response to the detected audio characteristic not matching the intended audio characteristic, wherein the remedial action changes the audio content that is being output from the at least one speaker;
wherein determining the detected audio characteristic from the detected sound comprises:
discerning dialogue from the detected sound; and
determining text from the discerned dialogue,
wherein determining the intended audio characteristic from the audio content of the media content event comprises:
accessing closed captioning text of the media content event; and
determining second text from the closed captioning text,
wherein comparing the determined detected audio characteristic with the determined intended audio characteristic comprises comparing the text from the discerned dialogue with the closed captioning text, and
wherein performing the at least one remedial action in response to the text from the discerned dialogue not matching the closed captioning text comprises changing an audio channel input from a first audio input channel to a second audio input channel.

8. A method that presents media content, the method comprising:
detecting sound using at least one microphone, wherein the detected sound includes at least audio content that is being output from at least one speaker;
determining a detected audio characteristic from the detected sound;
determining an intended audio characteristic from audio content of a media content event that is currently being presented, wherein the intended audio characteristic is the same as the detected audio characteristic, and
wherein the intended audio content characteristc is determined during a duration that the second sound detection occurs:
comparing the determined detected audio characteristic with the determined intended audio characteristic; and
performing at least one remdial action in response to the detected audio characteristic not matching the intended audio characteristic, wherein the remedial action changes the audio content that is being output from the at least one speaker,
wherein determining the detected audio characteristic from the detected sound comprises determining an absence of music in the detected sound,
wherein determining the intended audio characteristic from the audio content of the media content event comprises determining presence of music in the audio content of the media content event,
wherein comparing the determined detected audio characteristic with the determined intended audio characteristic comprises determining that music is absent in the detected sound and that music is present in the audio content of the media content event, and
wherein performing the at least one remedial action in response to the music being absent in the determined sound and present in the audio content of the media content event comprises changing an audio channel input from a first audio input channel to a second audio input channel.

9. A method that presents media content, the method comprising:
detecting sound using at least one microphone, wherein the detected sound includes at least audio content that is being output from at least one speaker;
determining a detected audio characteristic from the detected sound;
determining an intended audio characteristic from audio content of a media content event that is currently being presented,
wherein the intended audo characteristic is the same as the detected audio characteristic, and
wherein the intended audio content characteristic is determined during a duration that the sound detection occurs;
comparing the determined detected audio characteristic with the determined intended audio characteristic; and
performing at least one remedial action in respone to the detected audio characteristic not matching the intended audio characteristic, wherein the remedial action changes the audio content that is being output from the at least one speaker;
wherein determining the detected audio characteristic from the detected sound comprises determining an absence of audio content of the media content event in the detected sound,
wherein determining the intended audio characteristic from the audio content of the media content event comprises determining presence of audio content in the media content event,
wherein comparing the determined detected audio characteristic with the determined intended audio characteristic comprises determining that audio content is absent in the detected sound and is present in the media content event, and
wherein performing the at least one remedial action in response to the audio content being absent in the determined sound and present in the media content event comprises ending muting of an audio channel input that is presenting the audio content of the media content event.

10. A method that presents media content, the method comprising:
detecting sound using at least one microphone, wherein the detected sound includes at least audio content that is being output from at least one speaker;
determining a detected audio characteristic from the detected sound;
determining an intended audio characteristic from audio content of a media content even that is currently being presented,
wherein the intended audio characteristic is the smae as the detected audio characteristic, and
wherein the inded audio content characteristic is determined during a duration that the sound detection occurs;
comparing the determined detected audio characteristic with the determined intended audio characteristic; and
performing at least one remedial action in repsonse to the detected audio characteristic not matching the intended audio characteristic, wherein the remdial action changes the audio content that is being output from the at least one speaker,
wherein determining the detected audio characteristic from the detected sound comprises:
discerning first dialogue from the detected sound;
determining first text from the discerned first dialogue;
selecting a first word of the first text; and
determining a first presentation time of the first word,
wherein determining the intended audio characteristic from the audio content of the media content event comprises:
discerning second dialogue from the audio content of the media content event;
determining second text from the discerned second dialogue;
selecting a second word of the second text; and
determining a second presentation time of the second word,
wherein comparing the determined detected audio characteristic with the determined intended audio characteristic comprises comparing the first presentation time of the first word with the second presentation time of the second word, and
wherein performing the at least one remedial action comprises one of advancing or delaying a presentation time of the audio content of the media content event by a predefined duration.

11. A system configured to present media content, comprising:
at least one a first microphone and a second microphone that are each configured to detect sound, wherein the sound includes at least output audio content that is being output from at least one speaker a plurality of speakers configured to output at least one of stereo and surround sound;
a processor system communicatively coupled to the microphone and configured to receive information corresponding to the detected sound, wherein the processor system is configured to:
determine a detected audio characteristic from the detected sound, wherein the detected audio characteristic is audio content output in stereo or is audio content output in surround sound;

determine, when the detected audio characteristic is in stereo, if the audio content of a media content event that is currently being presented is available in surround sound;

determine an intended audio characteristic from audio content of the media content event that is currently being presented, wherein the intended audio characteristic is a predefined user preference for presentation of audio content in surround sound when surround sound audio content is available the same as the detected audio characteristic, and wherein the intended audio content characteristic is determined during a duration that the sound detection occurs;

compare the determined detected audio characteristic with the determined intended audio characteristic; and perform at least one remedial action in response to the detected audio characteristic not matching the intended audio characteristic, wherein the remedial action changes the output audio content that is being output from the at least one speaker of the plurality of speakers to surround sound when the predefined user preference is for presentation of audio content in surround sound.

12. The system of claim 11, further comprising: a remote control, wherein at least the first microphone and the processor system reside in the remote control.

13. The system of claim 11, further comprising:
a first interface communicatively coupled to a first media content source;
a second interface communicatively coupled to a second media content source; and
an interface controller communicatively coupled to the processor system, the first interface and the second interface,
wherein the processor system is further configured to operate the interface controller to change an input channel from the first media content source with no surround sound to the second media content source with surround sound when the remedial action is performed.

14. The system of claim 11, further comprising:
a communication system interface, and configured to communicatively couple at least the first microphone and the second microphone to a remote diagnostics system via a communication network,
wherein the processor system resides at the remote diagnostics system and the detected sound is communicated from at least the first microphone and the second microphone to the remote diagnostics system via the communication network.

* * * * *